(12) United States Patent
Arcia

(10) Patent No.: US 9,185,901 B1
(45) Date of Patent: Nov. 17, 2015

(54) ATTRACTANT SCENT DISPENSER

(71) Applicant: Alfredo Arcia, Naples, FL (US)

(72) Inventor: Alfredo Arcia, Naples, FL (US)

( * ) Notice: Subject to any disclaimer, the term of this patent is extended or adjusted under 35 U.S.C. 154(b) by 60 days.

(21) Appl. No.: 14/056,499

(22) Filed: Oct. 17, 2013

(51) Int. Cl.
*A01M 31/00* (2006.01)
(52) U.S. Cl.
CPC .................................. *A01M 31/008* (2013.01)
(58) Field of Classification Search
CPC ....... A01M 31/008; A61L 9/12; A61L 9/127; B67D 2210/00131
See application file for complete search history.

(56) References Cited

U.S. PATENT DOCUMENTS

| | | |
|---|---|---|
| 4,506,806 A | 3/1985 | Lincoln et al. |
| 4,682,715 A | 7/1987 | Reeves |
| 4,735,010 A | 4/1988 | Grinarml |
| 5,060,411 A * | 10/1991 | Uhlman ............................... 43/1 |
| 5,074,439 A | 12/1991 | Wilcox |
| 5,148,949 A | 9/1992 | Luca |
| 5,263,274 A * | 11/1993 | Speed .................................. 43/1 |
| 5,746,019 A * | 5/1998 | Fisher ................................. 43/1 |
| 5,906,298 A * | 5/1999 | Ward ............................. 222/175 |
| 6,158,668 A | 12/2000 | Burgeson |
| 7,093,770 B1 | 8/2006 | Moran |
| 7,533,832 B2 | 5/2009 | Price et al. |
| 2006/0289668 A1 | 12/2006 | Szymczak et al. |
| 2008/0190008 A1* | 8/2008 | Aslin ................................... 43/1 |
| 2008/0315011 A1* | 12/2008 | Pesu .............................. 239/136 |

* cited by examiner

*Primary Examiner* — Darren W Gorman
(74) *Attorney, Agent, or Firm* — Livingston Loeffler, P.A.; Edward M. Livingston, Esq.; Ryan L. Loeffler, Esq.

(57) ABSTRACT

An attractant scent dispenser (1) having a preferably rounded bulb-shaped reservoir (2) that is filled with a liquid attractant (3), such as deer urine. A wick (4) extends from a distal end (5) of the reservoir and an eyelet (6) or other attaching means for attaching a cord (7) is located at a proximal end (8) of the reservoir. A hunter may use the cord to drag the reservoir on the ground to disperse a trail of attractant scent while the bulb shape of the reservoir prevents the attractant scent dispenser from becoming tangled in any debris on the ground.

6 Claims, 2 Drawing Sheets

ATTRACTANT SCENT DISPENSER

FIELD OF THE INVENTION

This invention relates to devices used for attracting wild game during hunting, and more particularly, to a device that dispenses an even trail of urine or other attractant scent on the ground behind a hunter.

BACKGROUND OF THE INVENTION

Many hunters use liquid attractant scents, such as deer urine, to mask their own scents and to lure prey to a location, such as a tree stand or blind. Such attractant scents are typically deposited on the ground and/or into the air using a conventional rag or sponge material that is tied to the hunter and dragged on the ground and/or tied to a branch near where the hunter is positioned in wait. However, such conventional means of depositing attractant scents are highly inefficient due to the fact they dispense too much attractant and/or dry out too quickly because the soaked rag or sponge exposes the liquid attractant to the air and does not dispense the liquid attractant in an even manner. An additional problem with devices that are dragged on the ground is that they can easily become caught in debris laying on the ground.

Therefore, a need exists for a device that dispenses an even trail of urine or other liquid attractant scent on the ground behind a hunter to cover the hunter's own scent and to lure wild game to the hunter's location that also can be easily dragged across the ground without becoming tangled in debris.

The relevant prior art includes the following references:

| Pat. No. (U.S. Patent References) | Inventor | Issue/Publication Date |
| --- | --- | --- |
| 4,506,806 | Lincoln et al. | Mar. 26, 1985 |
| 4,682,715 | Reeves | Jul. 28, 1987 |
| 4,735,010 | Grinarml | Apr. 5, 1988 |
| 5,074,439 | Wilcox | Dec. 24, 1991 |
| 5,148,949 | Luca | Sep. 22, 1992 |
| 6,158,668 | Burgeson | Dec. 12, 2000 |
| 2006/0289668 | Szymczak et al. | Dec. 28, 2006 |
| 7,093,770 | Moran | Aug. 22, 2006 |
| 7,533,832 | Price et al. | May 19, 2009 |

SUMMARY OF THE INVENTION

The primary object of the present invention is to provide an attractant scent dispenser that dispenses an even trail of urine or other liquid attractant scent on the ground behind a hunter to cover the hunter's own scent and to lure wild game to the hunter's location that also can be easily dragged across the ground without becoming tangled in debris.

The present invention fulfills the above and other objects by providing a device for dispensing a trail of deer urine on the ground to attract deer to a desired spot. The device comprises a preferably rounded bulb-shaped reservoir that is filled with deer urine or other liquid attractant. A wick extends from a distal end of the reservoir and an eyelet for attaching a cord is located at a proximal end of the reservoir. A hunter may use the cord to attach the reservoir to his ankle and then drag the reservoir behind him as he walks to his hunting spot. The reservoir and wick drag on the ground and the wick dispenses a trail of deer urine on the ground as it is dragged. The reservoir and wick may also be tied by the cord to an all terrain vehicle so that is dragged behind the vehicle. The bulb shape of the reservoir allows the reservoir to be dragged smoothly across the ground without becoming stuck or tangled in debris.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
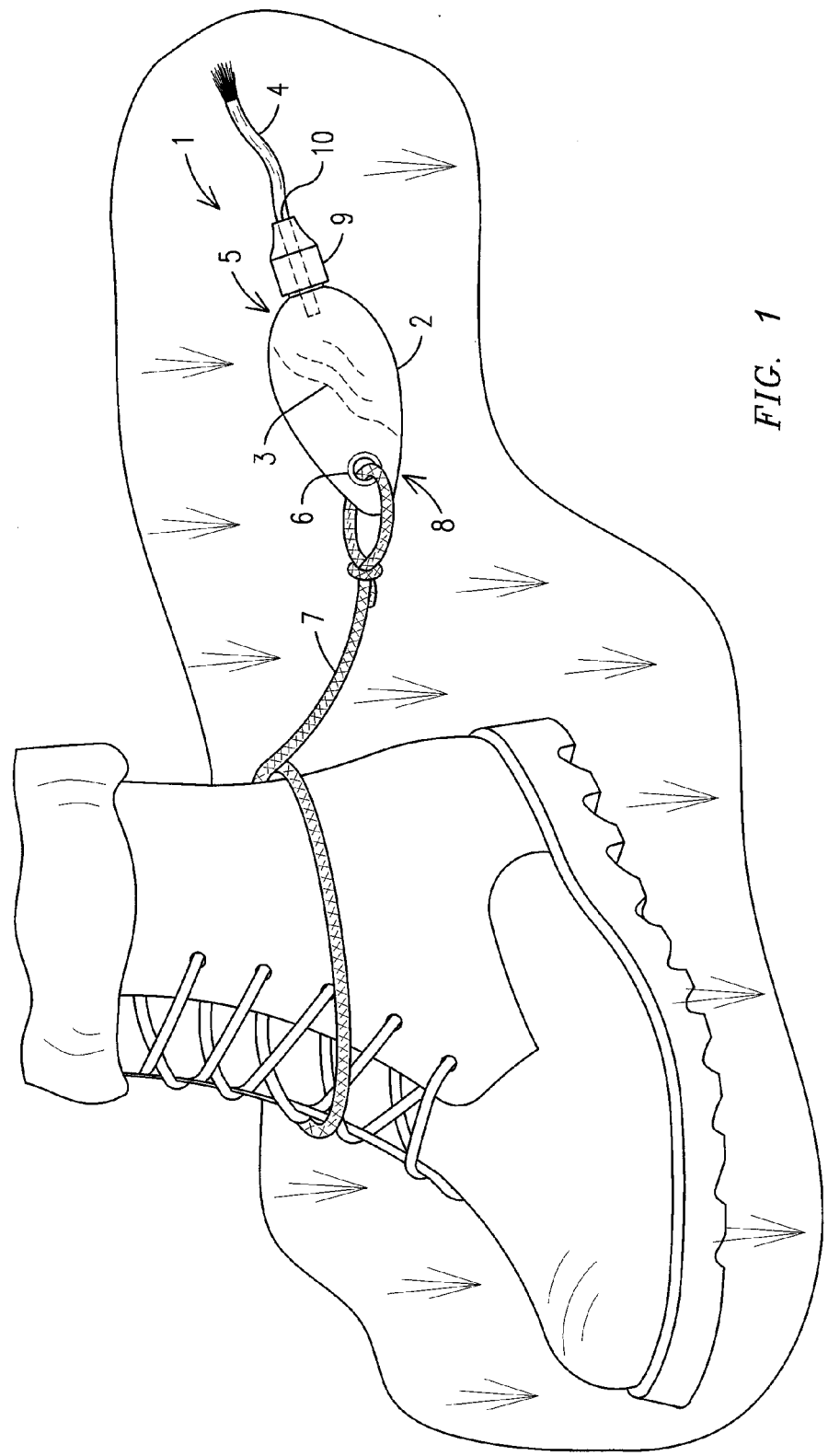
FIG. 1 is a view of the attractant scent dispenser in use tied to a hunter's ankle.
Figure 2:
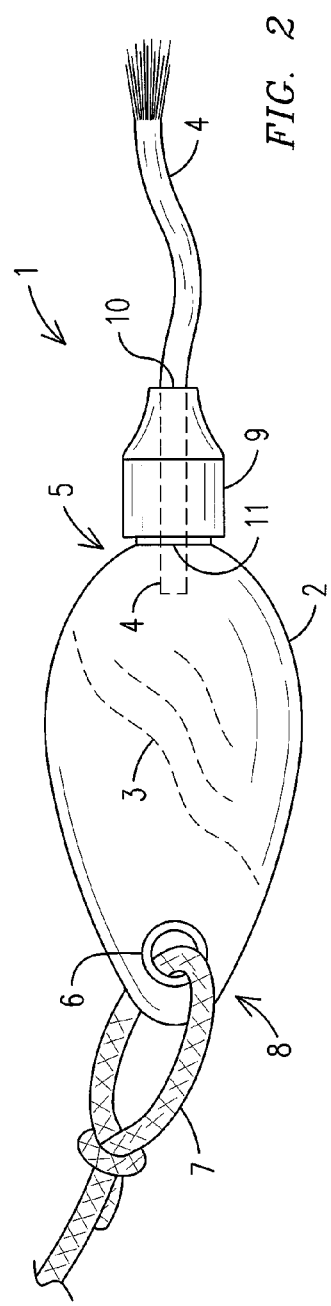
FIG. 2 is a side plan view of the attractant scent dispenser of the present invention.
Figure 3:
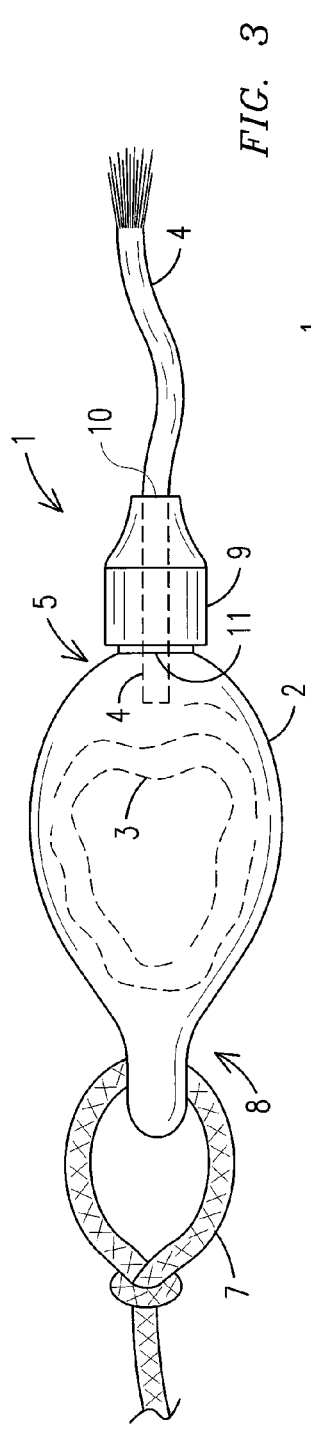
FIG. 3 is a top plan view of the attractant scent dispenser of the present invention.
Figure 4:
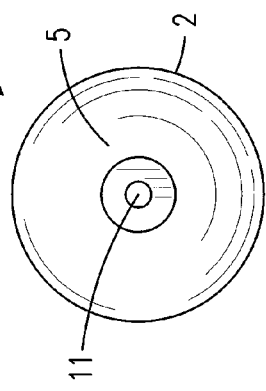
FIG. 4 is a view of a distal end of the reservoir the present invention.

For purposes of describing the preferred embodiment, the terminology used in reference to the numbered components in the drawings is as follows:

1. attractant scent dispenser, generally
2. reservoir
3. liquid attractant
4. wick
5. distal end of reservoir
6. eyelet
7. cord
8. proximal end of reservoir
9. cap
10. first aperture
11. second aperture With reference to FIGS. 1-4, the attractant scent dispenser 1 comprises a preferably rounded bulb-shaped reservoir 2 that is filled with a liquid attractant 3, such as deer urine. A wick 4 extends from a distal end 5 of the reservoir 2 and an eyelet 6 or other means for attaching a cord 7 is located at a proximal end 8 of the reservoir 2. A hunter may use the cord 7 to attach the reservoir 2 to his ankle (as illustrated in FIG. 1) and then drag the reservoir 2 behind him as he walks to a hunting spot. The reservoir 2 and wick 4 drag on the ground and the wick dispenses 4 a trail of liquid attractant 3 on the ground as it is dragged. A cap 9 having a first aperture 10 located thereon is located on the distal end 5 of the reservoir 2 and may be removed to fill the reservoir 2 with liquid attractant 3 through a second aperture 11 located on the distal end 5 of the reservoir 2 (as illustrated in FIG. 4). The wick 4 passes through the first aperture 10 in the cap 9 and is locked in place on or within the reservoir 2 to receive liquid attractant 3 that passes from the reservoir 2 to the wick 4. An additional advantage of the conical bulb shaped reservoir 2 is that the proximal end 8 is caused to be raised above the distal end 5 while the dispenser 1 is being dragged, thereby causing the liquid attractant 3 to pool at the distal end 5 of the reservoir 2 to constantly soak the wick 4. The bulb shape of the reservoir 2 provides a larger diameter near the distal end 5, thereby allowing the reservoir 2 to be dragged smoothly across the ground without becoming stuck or tangled in debris.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

I claim:

1. An attractant scent dispenser comprising:
   a substantially bulb-shaped reservoir for holding a liquid attractant;
   said reservoir having a distal end and a proximal end;
   a wick extending from the distal end of the reservoir;
   a cap attached to the distal end of the reservoir through which the wick passes; and
   an eyelet located on the proximal end to which a cord is attached.

2. The attractant scent dispenser of claim 1 wherein:
   said reservoir comprises a diameter near the distal end that is larger than a diameter located near the proximal end.

3. An attractant scent dispenser comprising:
   a substantially bulb-shaped reservoir for holding a liquid attractant;
   said reservoir having a distal end and a proximal end;
   said reservoir comprises a diameter near the distal end that is larger than a diameter located near the proximal end;
   a wick extending from the distal end of the reservoir; and
   an eyelet located on the proximal end to which a cord is attached.

4. The attractant scent dispenser of claim 3 further comprising:
   a cap attached to the distal end of the reservoir through which the wick passes.

5. An attractant scent dispenser comprising:
   a substantially bulb-shaped reservoir having rounded edges for holding a liquid attractant;
   said reservoir having a distal end and a proximal end;
   said reservoir comprises a diameter near the distal end that is larger than a diameter located near the proximal end;
   a wick extending from the distal end of the reservoir; and
   an eyelet located on the proximal end to which a cord is attached.

6. The attractant scent dispenser of claim 4 further comprising:
   a cap attached to the distal end of the reservoir through which the wick passes.

* * * * *